A. C. CROFFORD.
METHOD OF SEALING PRESERVING JARS.
APPLICATION FILED JULY 8, 1918.

1,372,672. Patented Mar. 29, 1921.

Witness
Wm C. Dashiell

Inventor
Ada C. Crofford
By
Attorney

UNITED STATES PATENT OFFICE.

ADA C. CROFFORD, OF BENNETT COUNTY, SOUTH DAKOTA.

METHOD OF SEALING PRESERVING-JARS.

1,372,672.  Specification of Letters Patent.  Patented Mar. 29, 1921.

Application filed July 8, 1918. Serial No. 243,881.

*To all whom it may concern:*

Be it known that I, ADA C. CROFFORD, a citizen of the United States, residing in Bennett county, South Dakota, near Cody, Nebraska, have invented certain new and useful Improvements in Methods of Sealing Preserving-Jars, of which the following is a specification.

This invention relates to a method of sealing preserving jars and has for its object to improve upon the method of sealing which is carried out in sealing the jar of the patent to Alexander H. Kerr, No. 1152107, dated Aug. 31, 1915.

In the Kerr patent aforesaid the inner disk which carries the sealing medium or compound is applied to the mouth of the jar. The screw band is then applied to the jar and by turning the screw band, the inner, sealing disk is forced against the mouth of the jar and becomes set when the sealing compound cools. In other words, the cap is clamped down by the screw band.

In the practical use of the Kerr sealing disk, it is found that the disk, being a separate element from the screw band, nearly always catches in the threads of the screw band, thus keeping the hand of the canner close to the mouth of the preserving jar in the process of adjustment and permitting the germ-laden outer air to have access to the contents of the jar until this difficulty is overcome. Due to this defect in the method of sealing, many jars of food are lost and a still greater number must be re-sterilized.

My new method, while contemplating the use of the Kerr sealing disk and screw band, or their equivalents, entirely does away with possibility of the sealing disk catching in the screw band and the consequent difficulty above-explained. My method contemplates the direct application of heat and weight to the sealing disk when the latter is upon the mouth of the jar and, after such sealing has been accomplished, and the sealing compound is cold and a vacuum formed, applying the screw band to the jar. In my method the sealing disk is not pressed to the mouth of the jar by applying the screw band to the jar immediately the sealing disk has been applied. On the contrary, means other than the screw band, such as extraneous means, is employed to apply heat and weight to the sealing disk to cause the sealing compound thereof to adhere to the mouth of the jar. After such sealing has been effected, the screw band is applied.

In the accompanying drawings.

Referring to the Kerr Patent No. 1152107, dated Aug. 31, 1915, my improved method will be understood from the following description, in connection with the accompanying drawings.

Figure 1:
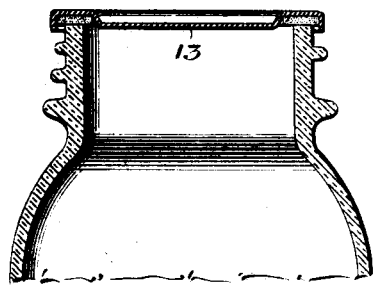
Figure 1 illustrates the first step of the process, that of placing the disk on the jar.
Figure 2:
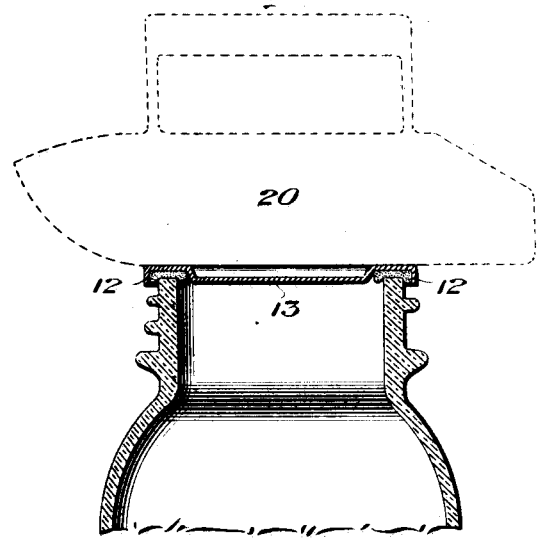
Fig. 2 shows the second step, that of placing an extraneous heated weight on the disk, the weight being allowed to remain until the sealing material becomes plastic; longer, if desired.

The jar is filled and the sealing disk 13 of said patent is placed on the mouth of the jar, as shown in Fig. 1. Heat and weight are now applied to the sealing disk 13 by any suitable means as, for instance, a hot, but not hissing hot, sad iron 20, which may be left on the sealing disk until said sad iron is required for another sealing operation. The heat of the iron renders the sealing material 12 of the said patent suitably plastic to effect the sealing of the disk to the jar and the pressure due to the weight of the said iron, whether applied for a brief period only, or allowed to remain, insures perfect sealing without possibility of any holes being left open to admit air to the interior of the jar. After sealing has been effected, the sad iron 20 is removed.

Figure 3:
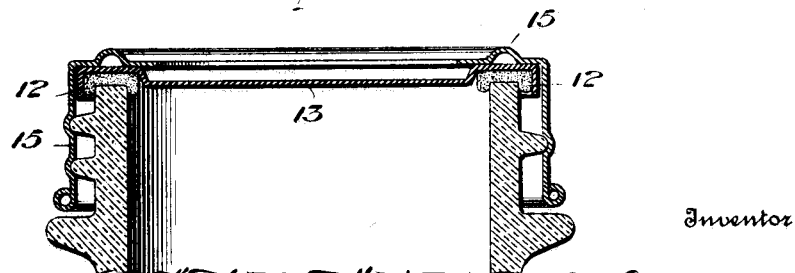
Fig. 3 discloses the application of the screw band to hold the sealed disk on the jar.

When the jar is cold and a vacuum formed, the screw band 15 of the aforesaid patent is screwed onto the jar and retains the sealing disk in position, as shown in Fig. 3. I do not rely on the screw band, in carrying out my method, to effect sealing and do not apply said band until the sealing operation has been effected. Consequently, there is no possibility of the catching of the sealing disk in the screw band, as with the method employed in sealing the jar under the Kerr patent and hence no danger of either imperfect sealing or contamination of the contents of the jar, nor is there any necessity for resterilization.

When meats or vegetables are to be "cold-packed" the sealing disk 13 is placed on the filled, cold, jar in the manner heretofore set forth and a warm, not hot, sad iron such as 20 is placed on the sealing disk. The iron should be no hotter than the touch of the fingers can bear. When the gum or sealing compound 12 is set, the screw band 15 is applied to the jar to retain the sealing disk and the jar is put to boil in cool water and approved cold-packing methods followed. After the jars are taken out of the water the screw band is tightened and they are allowed to become cold and a vacuum to form. The screw band 5 is then removed to test the effectiveness of the sealing of the disk 13. If found to be a perfect seal, the screw band is put on the jar again and the jar is set away.

The feature of my method which I claim is original is the sealing of the jar by direct application of heat and weight instead of by the slower and less certain method of clamping the cap down by means of the screw band.

In practising my method, the office of the screw band is to keep the cap from being blown off and the contents of the jar scattered over the surrounding objects, in the event of fermentation of the contents of the jar while in storage. The screw band is not used in sealing, except in cold-packing, when it is used to hold the cap on while the jar is being sterilized.

What I claim is:

The method of sealing preserving jars consisting, first in applying to the mouth of the jar a disk or cover carrying sealing material which will become plastic when hot; second placing directly on the disk a previously heated extraneous weight to cause the sealing material to adhere to the jar; third removing the extraneous weight and allowing the sealing material to cool and set and, finally, after the sealing material has cooled and become set, applying a screw band to the mouth of the jar and tightening said band to cause it to engage the disk or cover for the purpose of permanently retaining the previously sealed disk or cover on the jar until the contents of the jar is to be used.

In testimony whereof I affix my signature.

ADA C. CROFFORD.